Figure 1:
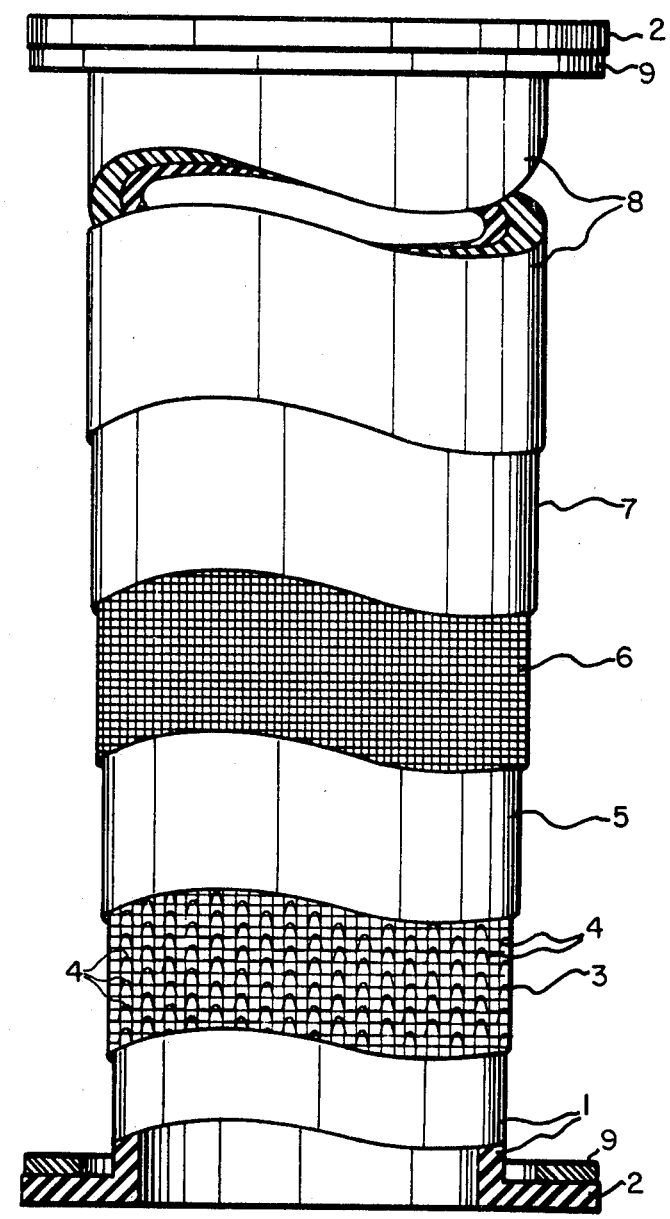

United States Patent [19]

Ekström

[11] 4,256,523

[45] Mar. 17, 1981

[54] METHOD FOR THE MANUFACTURE OF A PIPE

[75] Inventor: Stig O. M. Ekström, Malmö, Sweden

[73] Assignee: Handelsbolaget Evaksystem Ekstrom & Co., Malmo, Sweden

[21] Appl. No.: 955,227

[22] Filed: Oct. 27, 1978

Related U.S. Application Data

[62] Division of Ser. No. 756,799, Jan. 4, 1977.

[30] Foreign Application Priority Data

Jan. 4, 1977 [SE] Sweden .................................. 756799

[51] Int. Cl.³ ........................ B29D 23/00; B29H 7/14
[52] U.S. Cl. .................................. 156/190; 156/195; 264/129; 264/258; 264/310; 264/347
[58] Field of Search .................. 152/DIG. 14, 357 R, 152/358; 264/137, 314, 257, 258, 255, 310, 209, 347, 210, 286; 156/190, 195; 138/125, 137, 144, 177

[56] References Cited

U.S. PATENT DOCUMENTS

| 2,035,660 | 3/1936 | Lippitt .................... 152/358 |
| 2,788,804 | 4/1957 | Larkin .................... 138/125 |
| 2,814,313 | 11/1957 | Tate ....................... 156/190 |
| 2,830,622 | 4/1958 | Roberts et al. ........... 138/177 |
| 2,868,257 | 1/1959 | Redfearn ................. 152/357 R |
| 2,943,009 | 6/1966 | Mirsky et al. ........... 138/DIG. 2 |
| 2,967,796 | 1/1961 | Raffel .................... 264/314 |
| 2,999,780 | 9/1961 | Perrault .................. 264/314 |
| 3,026,223 | 3/1962 | Vanderbilt et al. ....... 156/190 |
| 3,219,738 | 11/1965 | Olson ..................... 264/286 |
| 3,258,384 | 6/1966 | Scott ..................... 264/314 |
| 3,273,978 | 9/1966 | Paul ...................... 152/356 |
| 3,379,591 | 4/1968 | Bradley .................. 264/310 |
| 3,424,220 | 1/1969 | Schuerch ................. 152/358 |
| 3,682,201 | 8/1972 | Atwell et al. ............ 138/137 |
| 3,934,064 | 1/1976 | Lowthian ................. 138/177 |
| 4,044,799 | 8/1977 | Higbee et al. ............ 138/137 |
| 4,091,063 | 5/1978 | Logan ..................... 138/125 |
| 4,104,095 | 8/1978 | Shaw ...................... 138/144 |

Primary Examiner—W. E. Hoag
Attorney, Agent, or Firm—Irvin A. Lavine

[57] ABSTRACT

This disclosure relates to a method of manufacturing a pipe having a rubber lining within a layer of looped fabric and a resin layer.

The method comprises placing a tubular layer of unvulcanized rubber on an expansible mandrel, then wrapping a layer of looped fabric on the rubber layer, with the loops outwardly directed. The mandrel is expanded to draw the looped fabric partially into the rubber, the protruding loops then being impregnated with uncured thermosetting resin, and glass fabric is then wrapped on the resin.

4 Claims, 4 Drawing Figures

METHOD FOR THE MANUFACTURE OF A PIPE

This is a division of application Ser. No. 756,799, filed Jan. 4, 1977.

It has already been suggested to use pipes or tubes having an inner lining of rubber material which is wear resistant and also resistant to chemicals, for the conveyance of for instance suspensions of wearing material and also oils and corrosive liquids. The pipes proper have mostly been steel pipes into which the inner lining has been glued to the inner side of the steel pipe. For this purpose, the inner side of the steel pipe has first been thoroughly cleaned and coated with a primer suited to the rubber material and steel material utilized, whereupon the rubber lining has been glued with its cleaned outer side to the inner side of the steel pipe. Sometimes, an unvulcanized rubber lining has been inserted in the primed steel pipe, whereupon the unvulcanized rubber lining was pressed with the aid of a curing bag against the steel pipe during the subsequent vulcanization process for vulcanization of the rubber material and the fixation thereof to the steel pipe. Although great care is taken it often happens that the bond between the rubber lining and the steel pipe is inferior at some points. Another disadvantage inherent in these previously known, internally rubber coated pipes resides in that they are heavy and expensive, especially if stainless steel pipes have to be used in view of the desired life of the pipe structure. It has therefore been tried to use the same anchoring methods in arranging rubber linings in glass fibre reinforced plastic pipes. However, it has proved very difficult to obtain a sufficiently reliable bond between the thermosetting resin and the rubber material, for which reason the prior-art, rubber-lined glass fibre reinforced plastic pipes did not possess sufficient resistance to rupture to permit being used for instance as pipelines for the conveyance of oils or for other purposes where a separation between the resin and the rubber material cannot be tolerated.

The invention relates to a method of manufacturing glass fibre reinforced plastic pipes provided with rubber linings.

The method of the invention comprises disposing a tubular layer of unvulcanized rubber material on an expansible mandrel and winding onto said tubular layer a looped fabric which is tightened against the unvulcanized rubber material and has its loops outwardly directed, and expanding the mandrel to the requisite extent in order that the looped fabric shall be partially drawn into the unvulcanized rubber material at the subsequent heating of the tubular layer for the vulcanization of the rubber material, whereupon the vulcanized tubular rubber layer with its looped fabric partially vulcanized thereinto and having protruding loops is impregnated with a still uncured thermosetting resin which is reinforced by being wrapped with further glass fibre layers which are also impregnated with the still uncured thermosetting resin, after which follows curing of all thermosetting resin and possibly applying one or more further surface layers of non-reinforced thermosetting resin. By this manufacturing process it is possible very carefully to determine beforehand the depth to which the looped fabric penetrates into the rubber lining so that the looped fabric will be both strongly anchored to the rubber lining and have a sufficient amount of free non-impregnated glass fibre material, especially in the form of protruding loops, in order to be strongly united with the glass fibre reinforced plastic layers when said layers are built up on the outer side of the vulcanized rubber lining.

Figure 2:
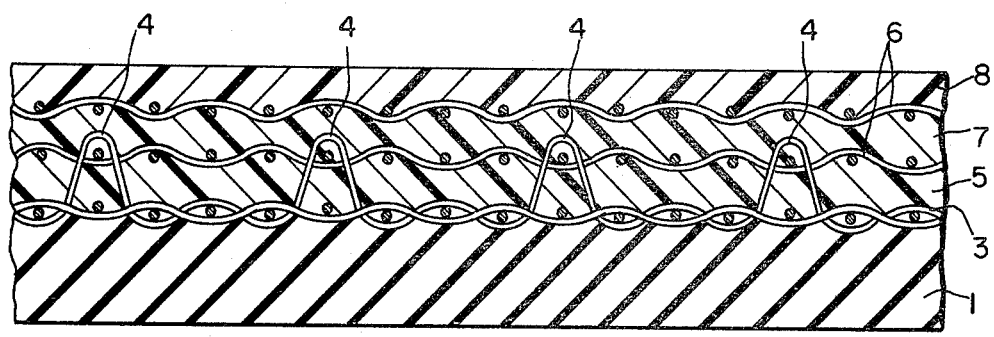
Figure 3:
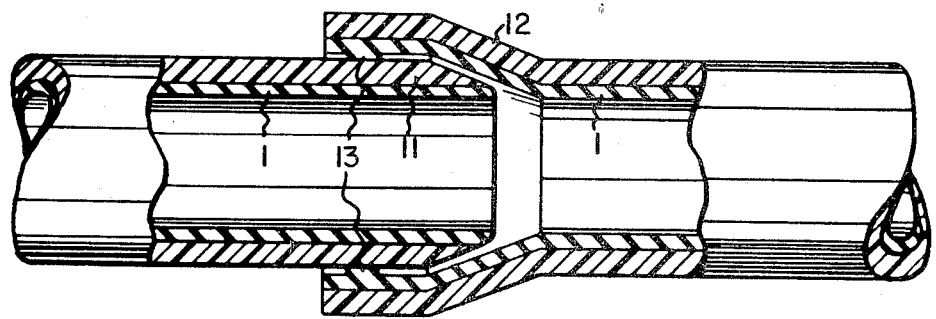
Figure 4:
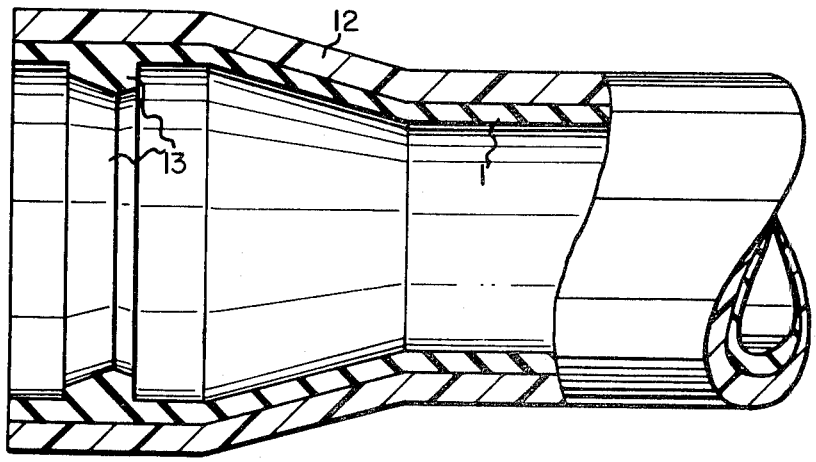

The invention will be described more in detail hereinbelow with reference to the accompanying drawings in which:

FIG. 1 schematically shows a pipe made in accordance with the method of the present invention, the different layers of the pipe having been partially removed for illustration of the structure of the pipe;

FIG. 2 on a larger scale shows a section of a wall of the tube shown in FIG. 1; and FIGS. 3 and 4 are partial views of the ends of pipes formed in accordance with the present invention method.

As will appear particularly from FIGS. 1 and 2 the pipe according to the present invention is provided with an inner lining 1 of rubber. A looped fabric 3, 4 of glass fibre material has been partially vulcanized into the outer side of said rubber lining at the vulcanization of the rubber material. This looped fabric is partially vulcanized into the rubber lining in such a way that in any case the loops 4 of the fabric protrude from the rubber material. After the vulcanization of the rubber and the simultaneous vulcanization of the looped fabric thereinto, the parts of the looped fabric which are not enclosed by rubber are impregnated with a liquid, still uncured plastic material 5, whereupon further layers of glass fibre fabric or glass fibre reinforcement 6 are wrapped about the pipe being manufactured. As the pipe is built up to the requisite thickness and to the requisite resistance to rupture further, still uncured thermosetting resin 7 is supplied. A curing of all thermosetting resin is then carried out. Finally, a surface layer of gelcoat 8 can be applied to impart a good surface finish to the manufactured tube.

As will appear from FIG. 1 the flanges of the pipe can be rigidified at the manufacture of the pipe by securing a steel ring 9 against the rubber flange 2 with the aid of interleaved, glass fibre reinforced thermosetting resin.

But one reinforced glass fibre layer in the resin material has been illustrated in FIG. 1 but it is of course possible to utilize several such layers, if this is required in view of the requisite resistance to compression of the pipe.

As shown in FIGS. 3 and 4 the pipe may be formed with spigot and socket ends 11 and 12, respectively, which are integral with the remaining pipe. On the inner side of the rubber lining there may be formed, in the socket end, an annular bead 13 which serves as a fixed sealing element so that loose gaskets are dispensed with when spigot and socket pipes are joined together.

The pipes according to the present invention can be manufactured in the following manner. As inner pipe of non-vulcanized rubber is formed directly on or is passed onto an expansible mandrel and coated with a primer solution (solution or rubber in a solvent); this primer may contain a vulcanizing agent. The mandrel may possibly be formed for rapid rotation about its longitudinal axis in the subsequent vulcanizing process. A looped fabric of glass fibre, preferably glass fibre roving, is then wrapped or wound about the non-vulcanized tubular rubber layer, and said looped fabric is turned with its loops outwardly and is tightened against the non-vulcanized rubber layer. The mandrel is then expanded to such an extent that the looped fabric at the subsequent vulcanization of the rubber will be partially drawn into the surface layer of the rubber pipe so that in any case the loops of the looped fabric still protrude from the rubber material. The pipe thus treated is then introduced into a vulcanizing pan in which the pipe may be caused to rotate while it is heated for the vulcanization of the rubber.

After finished vulcanization the rubber pipe with the looped fabric adhering thereto is removed from the vulcanizing pan and coated with a still uncured thermosetting resin, preferably polyester resin, to which the requisite catalyst and accelerator additives have been added. While the thermosetting resin still is in an uncured state one or more further layers of glass fibre fabric are wrapped about the pipe, further still uncured thermosetting resin being added, as need be, to saturate the various glass fibre layers. After the requisite thickness and strength have been attained the thermosetting resin is cured, the loops of the looped fabric and also other parts not enclosed by rubber serving as a mechanical bond between the rubber lining and the glass fibre reinforced plastic layers. This mechanical bond provides a very high resistance to separation between the rubber lining and the glass fibre reinforced plastic pipe. Finally, an outer layer of gelcoat can be applied to impart a good surface finish to the pipe.

The inner rubber layer in the pipe according to the present invention is formed by a rubber material which has the requisite properties in view of the intended use of the pipe. If this pipe is to be used for the conveyance of wearing material, the rubber material should thus be formed by a wear resistant rubber material. If, on the other hand, the pipe is to be used for the conveyance of chemicals, possibly corroding solutions, the rubber material must be selected accordingly. In some cases the rubber material may be hard rubber, if a good resistance to chemical attacks is required.

What I claim and desire to secure by Letters Patent is:

1. A method of manufacturing a pipe comprising:
 placing a tubular layer of unvulcanized rubber on an expansible elongate mandrel,
 wrappig on said rubber layer a layer of fabric having loops protruding therefrom with the said loops extending outwardly from said fabric layer, away from said rubber layer,
 expanding said mandrel,
 placing said mandrel in a heated zone to vulcanize said rubber, rotating said mandrel about its longitudinal axis while said mandrel is in said heated zone,
 removing the vulcanized rubber and fabric article thus formed from said heating zone, and with said loops protruding outwardly, impregnating said fabric with an uncured thermosetting resin, wrapping said resin with at least one layer of glass fibre impregnated with uncured thermosetting resin, and curing said resin.

2. A method as claimed in claim 1, wherein the looped fabric is formed by glass fibre roving.

3. A method as claimed in claim 1, wherein the looped fabric is formed by a ground fabric of tissue or knitted fabric and loops fixed to said ground fabric and protruding therefrom.

4. The method of claim 1, wherein the impregnating of said fabric comprises the impregnation of resin in surrounding relationship to said protruding loops.

* * * * *